UNITED STATES PATENT OFFICE.

DAGMAR H. REIMULLER, OF MORRIS PLAINS, NEW JERSEY.

LUTING OR CEMENTING COMPOSITION.

1,269,116.     Specification of Letters Patent.     Patented June 11, 1918.

No Drawing.     Application filed January 23, 1918. Serial No. 213,415.

*To all whom it may concern:*

Be it known that I, DAGMAR H. REIMULLER, a citizen of the United States, and a resident of Morris Plains, Morris county, State of New Jersey, have invented certain new and useful Improvements in Luting or Cementing Compositions, of which the following is a specification.

My invention relates to a composition of matter for mending articles of aluminum, copper, brass, iron, agate galvanized and tin ware, such as kitchen utensils or the like or metal articles of any kind in which it may be necessary to close up leaks or cracks or the like therein.

One of the objects of my invention is to provide a cement which can be easily applied, which will assume sufficient hardness so as not to come off of the articles cemented therewith.

Another object is to provide a cement which will not become brittle and crack while the repaired articles are in use and which will look well on the same.

Other objects will appear from the subjoined specification and claims.

In carrying out my invention I prepare a composition by mixing together asbestos, preferably such as has been previously shredded, oxid of zinc, black oxid of manganese, china clay, aluminum powder, varnish and linseed oil.

These ingredients are preferably mixed in the following proportions measured by volume:

8 parts of asbestos.
4 parts of oxid of zinc.
4 parts of black oxid of manganese.
3 parts of china clay.
6 parts of aluminum powder.

A liquid consisting of one-half varnish and one-half linseed oil.

The above named quantities of asbestos, oxid of zinc, black oxid of manganese, china clay and aluminum powder are preferably arranged in layers upon one another and are then mixed with the above mentioned quantities of varnish and linseed oil until the mixture assumes the consistency of a good putty. Suitable portions of this mixture are then taken and may then be conveniently rolled into sticks about one third of an inch in diameter by means of a flat wooden paddle.

In using the said composition for example for the purpose of mending a kitchen utensil, such as a pot, which has a hole in it, I proceed in the following manner:

The end of the above mentioned stick is heated in a suitable manner by any convenient means to such a degree that it may be readily handled when so heated. A small quantity of the same is then pinched off and rolled between the fingers. It is then pushed through the hole to be closed, one finger being held on one side and another finger on the other side so that the portion of the composition taken is flattened out on both sides. It is then heated for about ten minutes in order to bake it. When it is baked hard a little water is poured into the mended utensil and it is allowed to boil for a few minutes. After the utensil has cooled down, the mending process is finished.

The asbestos is used for the purpose of utilizing its fireproof qualities and for holding the other ingredients together, after the mixture has been baked. The purpose of the china clay is to provide a material which bakes quicker and harder than any of the other ingredients and the oxid of zinc and the black oxid of manganese form a combination which make the composition very strong and resistant to wear. The aluminum powder is added for the purpose of giving the composition the color of aluminum so that it looks well after being applied to the articles mended therewith. The varnish is used as a volatile binder to hold the said other ingredients together before baking and the linseed oil serves the purpose of a preservative agent before the cement is used.

It is understood that I do not limit myself to the exact quantities of the various ingredients of my cement enumerated above, as it is obvious that the percentage of the various ingredients comprised therein may be varied within reasonable limits without departing from the spirit of my invention.

Having now described my invention what I claim as new and desire to secure by Letters Patent is:

1. A composition for mending metallic articles containing black oxid of manganese, oxid of zinc, china clay and a refractory binder.

2. A plastic composition for mending metallic articles, containing black oxid of manganese, oxid of zinc, china clay, a refractory binder and a volatile binder.

3. A plastic composition for mending metallic articles, containing black oxid of manganese, oxid of zinc, china clay, a refractory binder, a volatile binder and a preservative.

4. A composition for mending metallic articles having the consistency of putty consisting of asbestos, oxid of zinc, black oxid of manganese, china clay, aluminum powder and a binding and preserving fluid.

5. A composition of matter having the consistency of putty consisting of asbestos, oxid of zinc, black oxid of manganese, china clay, aluminum powder, and equal quantities of varnish and linseed oil.

6. A composition of matter of putty like consistency consisting of eight parts of asbestos, four parts of oxid of zinc, four parts of black oxid of manganese, three parts of china clay, six parts of aluminum powder, and equal quantities of varnish and linseed oil.

In witness whereof, I have hereunto set my hand at Morris Plains, county of Morris and State of New Jersey, this 19th day of January, 1918.

DAGMAR H. REIMULLER.